March 10, 1931.   R. JONKERGOUW ET AL   1,796,203
MOLDING
Filed Nov. 22, 1928
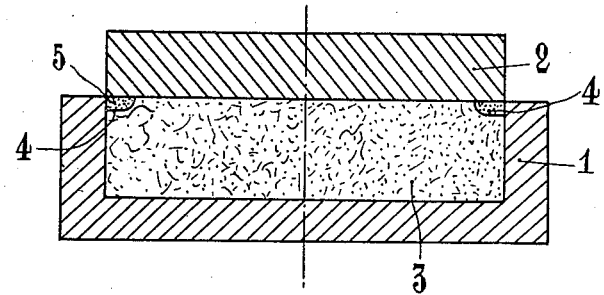
INVENTORS
Renier Jonkergouw
Jacques Demengeot
BY
Andrew T. Dupont
their ATTORNEY Patented Mar. 10, 1931

1,796,203

UNITED STATES PATENT OFFICE

RENIER JONKERGOUW, OF BRY ON THE MARNE, AND JACQUES DEMONGEOT, OF LYON, FRANCE

MOLDING

Application filed November 22, 1928, Serial No. 321,261, and in France November 30, 1927.

In molding under pressure certain plastic, pasty or other materials practice has shown that, up to a certain height from the bottom of the mold, the periphery of the work to be molded does not receive normally pressure from the counter-mold. As a result, the particles of all that portion of the material, not being subjected to the molding pressure, fail to agglomerate properly together, do not take the details of the mold and do not form one body with the remainder of the material, which remainder is perfectly agglomerated.

The object of this invention is to bring to the molding methods hitherto in use an improvement calculated to do away with the above set forth deficiency and to ensure the obtaining of perfectly molded work.

As diagrammatically shown by the only figure in the drawing appended hereto, said improvement consists in providing on the whole of the upper periphery of the material 3 contained in mold 1 a groove or recess 4 and in filling the latter with sand 5 or with any other inert substance, preferably pulverulent, of such a nature as not to be modified under the action of the temperature at which pressure is effectuated. Molding is then conducted in the ordinary manner by means of the countermold 2.

The packing with sand 5 or with other suitable material so arranged in the groove or recess 4 has the effect of distributing the pressure over the whole of the periphery of the mass thereby permitting of obtaining molded work absolutely conformable to the minutest details of the mold and the edges of which offer cleanest sharpness.

Having now particularly ascertained and described the nature of our said invention as well as the maner in which the same is to be performed, we declare that what we claim is:

1. In the method of molding plastic material, the steps which consist in providing on the upper periphery of the material housed in the mold a recess, filling said recess with pulverulent material, and applying pressure to the contents of the mold.

2. In the method of molding plastic material, the steps which consist in providing a groove along the upper periphery of the material in the mold, packing sand in said groove, and applying pressure to the contents of the mold.

In testimony whereof, we affix our signatures.

JACQUES DEMONGEOT.
RENIER JONKERGOUW.